Dec. 13, 1927.
F. A. BRINKMAN
1,652,345
CLUTCH RELEASE COUPLING
Filed July 19, 1926
2 Sheets-Sheet 1
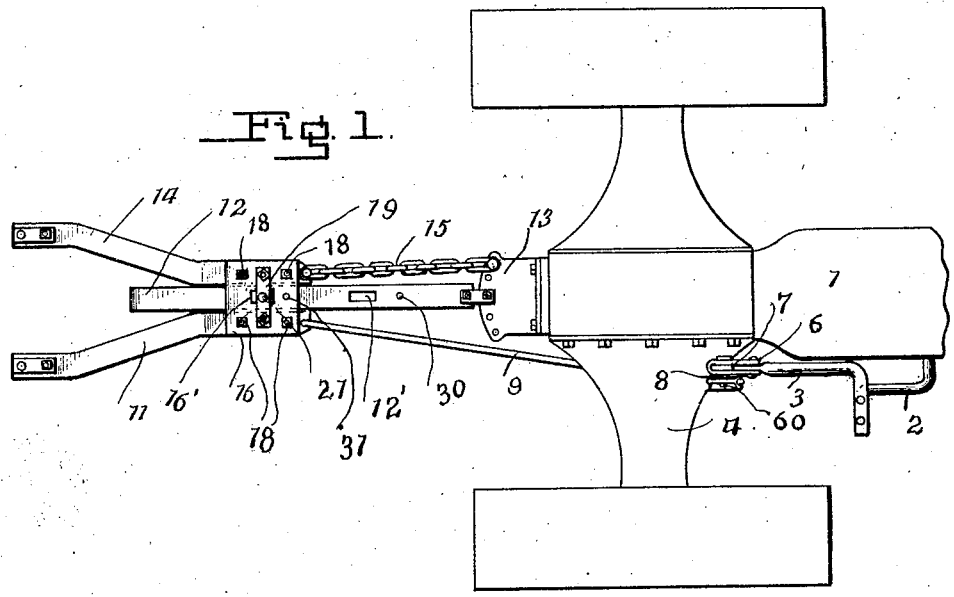
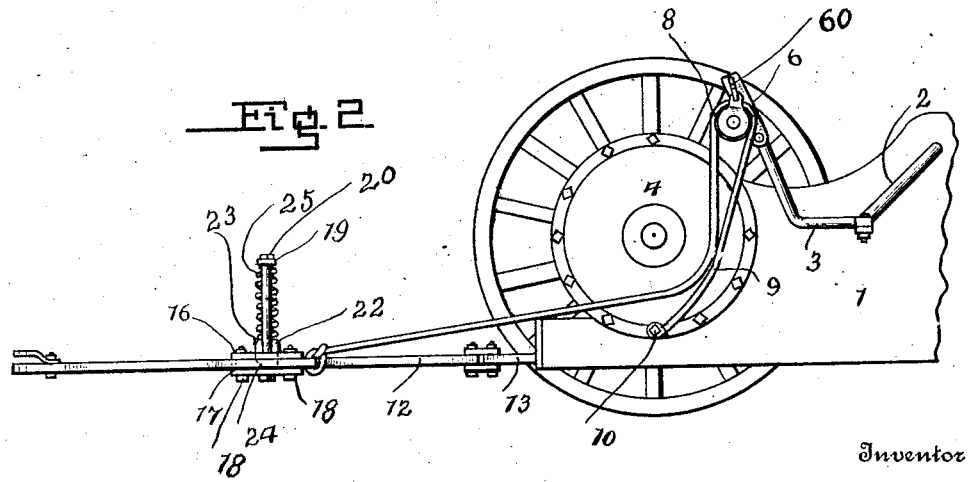
Inventor
F. A. Brinkman
By Lacey & Lacey, Attorneys Dec. 13, 1927.
F. A. BRINKMAN
1,652,345
CLUTCH RELEASE COUPLING
Filed July 19, 1926
2 Sheets-Sheet 2
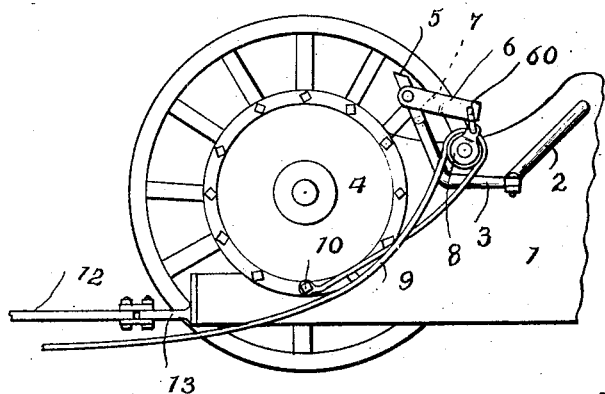
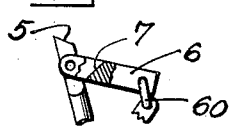
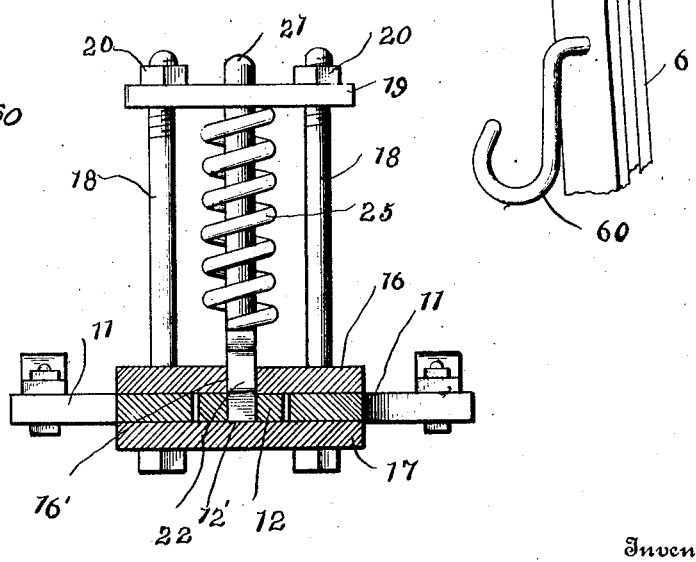
Inventor
F A. Brinkman
By Lacey & Lacey, Attorneys Patented Dec. 13, 1927.

1,652,345

UNITED STATES PATENT OFFICE.

FRITZ A. BRINKMAN, OF HUMBOLDT, KANSAS.

CLUTCH-RELEASE COUPLING.

Application filed July 19, 1926. Serial No. 123,452.

This invention relates to couplings for connecting a plow or other agricultural machine to a tractor, and has for its object the provision of inexpensive means which will operate efficiently to draw the machine at the rear of the tractor and will act automatically to stop the tractor in the event that the plow or other machine encounters a large rock or other obstruction which would tend to destroy some of the working elements. The invention is illustrated in the accompanying drawings and will be hereinafter fully set forth.

In the drawings:

Figure 1 is a plan view of a portion of a tractor having my coupling mechanism connected therewith;

Fig. 2 is a side elevation of the same, the near ground wheel being removed;

Fig. 3 is a view similar to Fig. 2 but showing a different position of the clutch control.

Fig. 4 is an enlarged detail transverse section.

Fig. 5 is a detail perspective of the guide pulley support.

Fig. 6 is a detail of the link shown in Fig. 5 and the lever to which it is attached.

The tractor, a portion of which is indicated at 1 in a conventional manner, may be of any well-known design and is equipped with a clutch pedal 2 whereby the engine shaft may be connected with the transmission gearing or disconnected therefrom at the will of the operator.

In carrying out my invention, I provide a lever arm 3 which is rigidly secured to the clutch pedal 2 preferably on top and is preferably of angular formation whereby, when in position, it will extend rearwardly from the pedal and then upwardly in advance of the rear axle housing 4. The upper end of the lever 3 is beveled, as indicated at 5, and to the said lever below the said beveled extremity is pivoted a link or bar 6 which is adapted to extend upwardly in alinement with the lever and be limited in its rearward movement by contact of an inclined internal shoulder 7 with the beveled end 5 of the lever. To the free end of this link or bar 6 is pivoted a hook 60 on which is suspended a pulley 8, around which is trained a cable 9 having one end secured to the rear axle housing by one of the bolts 10 which secure said housing to the differential case. The opposite end of the cable is carried under the axle housing and rearwardly beyond the same to be attached to a coupling bar 11 which has its rear end secured in any convenient manner to the plow beam. The said coupling bar 11 is disposed at one side of a draft pole or tongue 12 which has its front end connected to the drawbar 13 of the tractor, as shown clearly in the drawings, and at the opposite side of the said draft bar is a second coupling bar 14 which is similar to the coupling bar 11 and has its rear end also secured to the plow beam, and it is to be understood that these coupling bars as well as the bar 12 may be circular in cross section instead of rectangular, as shown. The front end of the coupling bar 14 is connected through a chain 15 with the drawbar 13 of the tractor and the two coupling bars 11 and 14 have their front end portions connected by the upper and lower plates 16 and 17 which pass respectively above and below and bridge the draft bar or tongue 12. These connecting plates 16 and 17 may be integrally connected at their side edges to form a loop encircling the coupling bars. The upper plate 16 is constructed with a longitudinal slot 16', and two of the bolts 18, whereby the two plates are secured to the coupling bars, are extended an appreciable distance above the coupling. Held upon the upper ends of the bolts 18 is a clip 19 which spans the space between the bolts and is held thereto by nuts 20 in an obvious manner. This clip has a central opening to slidably receive the upper end of a coupling pin 21 which is provided at its lower end with a flat-sided head 22 disposed longitudinally of the draft bar 12 and adapted to pass through the slot 16' and engage a similar slot 12' provided therefor in the draft bar, as will be understood. The rear edge of this head 22 is beveled, as indicated at 23 and 24, while its front edge is vertical throughout its extent. An expansion spring 25 is coiled around the pin 21 between the clip 19 and the head 22 and yieldably holds the head in the said slots, as will be understood, the tension of the spring being sufficient to normally maintain the coupled engagement of the parts.

In the normal position of the parts, the draft of the plow or other machine holds the cable 9 taut while the chain 15 may be slightly slack and the coupling pin 21 will be held in engagement with the slots in the plate 16 and the draft bar 12 by the force of the spring 25. Should the plow or other machine strike some rock or other obstruction which will impede its progress, the increased draft will overcome the tension of the spring 25 so that the beveled lower end of the head 22 thereof will ride out of the slot in the draft bar 12 and the coupling bars 11 and 14 will then be permitted to move slightly rearward in respect to the draft bar. This rearward movement will, of course, increase the tension in the cable 9 so that a downward pull will be exerted through the hook 60 upon the link 6 and the lever 3, swinging the clutch pedal 2 downwardly and forwardly so that the clutch will be opened and the further travel of the tractor will be stopped. The obstruction can then be removed and the parts restored to normal position. To facilitate the replacing of the coupling pin in its normal position, the link 6 may be swung forwardly, as shown in Fig. 3, so that the clutch pedal may then be again closed without putting tension upon the cable 9, and it will be noted that the hook 60 maintains the cable at the side of the link and below the upper end thereof in all positions of the link, so that the cable cannot be entangled with the link or the lever at any time. The transmission mechanism may then be thrown in reverse position so that the tractor will be backed sufficient to permit the drawbar 12 to ride under the pin 21 until the lower end of the pin again engages the slot 12' in the drawbar. The link 6 will then be again swung upwardly to the position shown in Fig. 2 and the operation of the machines may be resumed. The chain 15 provides a strong connection between the tractor drawbar and the coupling bar 14 so that the plow may be pulled out of the ditch by the operation of the tractor, if necessary.

The draft bar 12 and the upper connecting plate 16 are provided with openings 30 and 31 which may be made to register and receive a break pin to effect a temporary coupling in an emergency.

The device is exceedingly simple in the construction and arrangement of its parts and may be easily applied to any tractor and will operate advantageously when so applied.

It will, of course, be noted that an operator seated upon a plow or other trailing implement may pull upon the cable and thereby stop the tractor.

Both ends of the cable may be secured to the tractor so that, when the link 6 is swung up into alinement with the lever, the tension of the cable will hold the clutch open. Then, if the link be swung forward and downward, the clutch will close, thereby providing a convenient method of operating the tractor for belt work, avoiding the necessity of mounting the tractor to shift the gears into neutral, and then remounting to shift into gear.

Having thus described the invention, I claim:

1. Mechanism for the purpose set forth comprising a draft bar connected to a tractor, coupling bars disposed at the sides of the draft bar, plates connecting the coupling bars and passing above and below the draft bar, a coupling pin carried by said plates and arranged to engage the draft bar, means for yieldably holding the coupling pin in engagement with the draft bar and permitting release of the coupling pin under abnormal strain, and means for connecting one of the coupling bars with the clutch pedal of the tractor and operable to open the clutch when the coupling bars are released from the draft bar.

2. Mechanism for the purpose set forth comprising a draft bar connected to a tractor, coupling bars disposed at opposite sides of the draft bar and slidably supported at their front ends thereby, yieldable means carried by the coupling bars and engaging the draft bar to connect the coupling bars thereto, said means normally resisting sliding movement of the coupling bars, means connecting one of the coupling bars with the clutch of the tractor and oberable to open the clutch upon release of the said yieldable means, and a connection independent of the draft bar between the other coupling bar and the tractor.

3. Mechanism for the purpose set forth comprising a lever secured to the clutch pedal of the tractor, a link pivoted to said lever near the free end thereof, interengaging means on the link and the free end of the lever to limit rearward movement of the link, a pulley hung on the outer side of the link, and a cable secured at one end to the tractor in rear of the lever and at the other end fastened to a trailing implement and having its intermediate portion trained around said pulley and held taut whereby pull upon the cable will open the clutch and stop the further travel of the tractor.

In testimony whereof I affix my signature.

FRITZ A. BRINKMAN. [L. S.]